(12) United States Patent
Lin

(10) Patent No.: US 7,627,449 B2
(45) Date of Patent: Dec. 1, 2009

(54) APPARATUS FOR MEASURING ECCENTRICITY OF OPTICAL MODULE

(75) Inventor: Kuo-Lung Lin, Tu-Cheng (TW)

(73) Assignee: Hon Hai Precision Industry Co., Ltd., Tu-Cheng, Taipei-Hsien (TW)

( * ) Notice: Subject to any disclaimer, the term of this patent is extended or adjusted under 35 U.S.C. 154(b) by 484 days.

(21) Appl. No.: 11/309,688

(22) Filed: Sep. 12, 2006

(65) Prior Publication Data

US 2007/0146855 A1 Jun. 28, 2007

(30) Foreign Application Priority Data

Dec. 23, 2005 (CN) .................. 2005 1 0121247

(51) Int. Cl.
*G06F 15/00* (2006.01)
*G01B 11/00* (2006.01)

(52) U.S. Cl. ..................... 702/155; 356/497

(58) Field of Classification Search ........... 702/155, 702/182; 356/73.1, 401, 497; 348/362; 382/141, 382/182; 359/224

See application file for complete search history.

(56) References Cited

U.S. PATENT DOCUMENTS 5,757,486 A * 5/1998 Marcus et al. .............. 356/479

6,275,298 B1 * 8/2001 Marcus ...................... 356/497
2003/0107789 A1 * 6/2003 Hishioka .................... 359/223

FOREIGN PATENT DOCUMENTS

JP 11-94700 A 4/1999
JP 3597302 B2 12/2004

OTHER PUBLICATIONS

Yijie Niu et al., "Study on Measurement System of Centering Errors", Electric Measuring Technology, the fifth issue, pp. 5-6, published on Oct. 31, 2005 in China.

* cited by examiner

*Primary Examiner*—Bryan Bui
(74) *Attorney, Agent, or Firm*—Steven M. Reiss

(57) ABSTRACT

An exemplary apparatus (100) for measuring eccentricity of an optical module (23) includes a worktable (10), an image sensor device (17), a driving device (13), and a processing device (19). The worktable is configured for supporting the optical module. The image sensor device is configured for receiving an image of the optical module. The driving device is configured for driving rotation of the worktable. The processing device is connected to the image sensor device, and the processing device is configured for analyzing the image of the optical module.

12 Claims, 1 Drawing Sheet

APPARATUS FOR MEASURING ECCENTRICITY OF OPTICAL MODULE

FIELD OF THE INVENTION

The present invention generally relates to apparatuses for measuring eccentricity of optical module and, more particularly, to an apparatus for measuring eccentricity of an optical module.

DESCRIPTION OF RELATED ART

Currently, digital camera modules are included as a special feature in a wide variety of portable electronic devices and, of course, in stand-alone digital camera units. In recent years digital camera modules have become smaller and smaller, however, in spite of the small size of contemporary digital camera modules, consumers still demand excellent imaging. Eccentricity is an important parameter influencing imaging quality of a digital camera module.

In measuring the eccentricity of an optical module, a measuring apparatus is often used. The measuring apparatus includes a supporting table, a microscope, and an image sensor. In use, firstly, an optical module is disposed on a center of the supporting table. Secondly, the supporting table is rotated manually together with the optical module. Thirdly, the measuring person observes the eccentricity of the optical module through the microscope via naked eye observation during the rotation of the optical module. Thus, the measuring apparatus is slow and cumbersome to use to measure eccentricity of the optical module.

Therefore, a new apparatus for measuring eccentricity of optical module is desired in order to overcome the above-described shortcomings.

SUMMARY OF THE INVENTION

In one embodiment thereof, an apparatus for measuring eccentricity of an optical module includes a worktable, an image sensor device, a driving device, and a processing device. The worktable is configured for supporting the optical module. The image sensor device is configured for receiving an image of the optical module. The driving device is configured for driving rotation of the worktable. The processing device is connected to the image sensor device, and the processing device is configured for analyzing the image of the optical module.

Other advantages and novel features of the embodiments will become more apparent from the following detailed description thereof when taken in conjunction with the accompanying drawing.

BRIEF DESCRIPTION OF THE DRAWINGS

Many aspects of the present apparatus can be better understood with reference to the following drawing. The components in the drawing are not necessarily drawn to scale, the emphasis instead being placed upon clearly illustrating the principles of the apparatus and its potential applications. Moreover, in the drawing, like reference numerals designate corresponding parts.

DETAILED DESCRIPTION OF THE INVENTION

Figure 1:
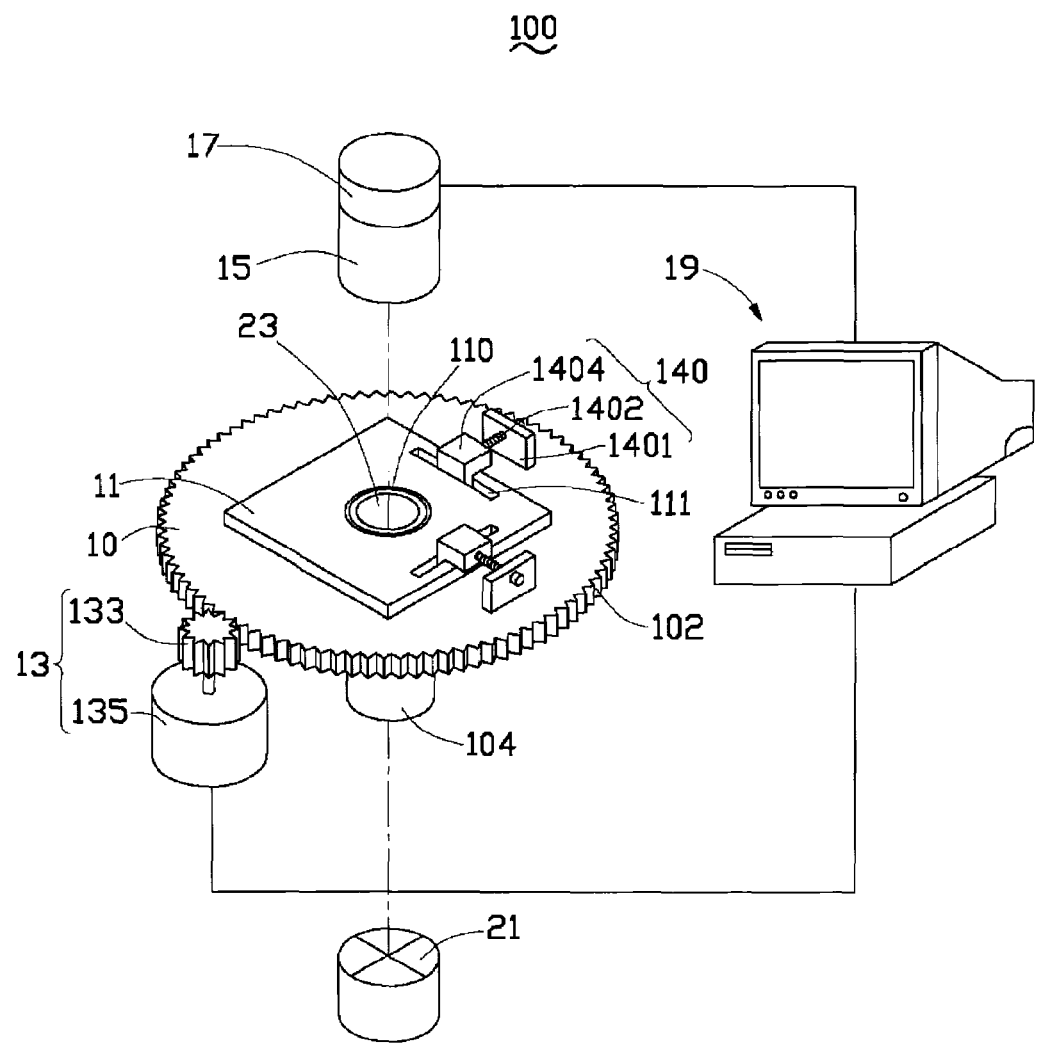
FIG. 1 is a schematic view of an apparatus for measuring eccentricity of optical module in accordance with a preferred embodiment.

Referring to FIG. 1, an apparatus 100 for measuring eccentricity of an optical module 23 according to a preferred embodiment includes a worktable 10, a driving device 13, a microscope device 15, an image sensor device 17, a processing device 19, and a light source 21. In this embodiment, the processing device 19 is a computer, and the optical module 23 can be an optical lens.

The worktable 10 has a supporting plate 11, a gear edge 102, and two adjusting mechanisms 140. The supporting plate 11 is positioned on a center of the worktable 10, and the adjusting mechanisms 140 are configured (i.e., structured and arranged) for adjusting the position of the supporting plate 11. The worktable 10 has a transparent center (not shown), and the worktable 10 is supported on a rotatable pole 104. In this embodiment, the pole 104 supports the center of the worktable 10, and the pole 104 is a hollow pole.

The supporting plate 11 is square in shape, and the supporting plate 11 includes a center hole 110 and two perpendicular slots 111. The center hole 110 is configured for supporting the optical module 23 thereon. The center hole 110 is aligned with the center of the worktable 10, the optical module 23, and the light source 21. Each of the adjusting mechanisms 140 includes a bracket 1401, a screw 1402, and a positioning element 1404. The positioning elements 1404 connect to the slots 111 of the supporting plate 11, and adjust the position of the supporting plate 11 by adjusting the screws 1402.

The driving device 13 includes a gear wheel 133 and a motor 135. The motor 135 is configured to rotate the gear wheel 133. The gear wheel 133 cooperates with the gear edge 102 of the worktable to rotate the worktable 10.

The microscope device 15 is disposed above the supporting plate 11, and is aligned with the optical module 23, the center of the worktable 10, the center hole 110 of the supporting plate 11, and the light source 21.

The image sensor device 17 is disposed on the microscope device 15. The image sensor device 17 is configured for receiving an image of the optical module. The processing device 19 is connected to the image sensor device 17 and the driving device 13, and the processing device 19 is configured for analyzing the image of the optical module 23. The processing device 19 can also control the rotation of the driving device 13.

The light source 21 is disposed below the worktable 10, and is aligned with the center of the worktable 10 and the center hole 111 of the supporting plate 11. The light source 21 is configured to emit a cross-shaped light. The center of the light is aimed at the center of the worktable 10.

In use, firstly, the optical module 23 is disposed on the center hole 111 of the supporting plate 11. Secondly, the motor 135 is used to rotate the worktable 10 through cooperation between the gear wheel 133 and the gear edge 102 of the worktable 10, and the optical module 23 on the supporting plate 11 is also rotated with the worktable 10. Thirdly, the microscope device 15 magnifies the image of the optical module 23, and the image is received by the image sensor device 17. Fourthly, the image sensor device 17 transfers the image to the processing device 19, and the processing device 19 analyzes the image. Fifthly, the supporting plate 11 is adjusted to a position such that the center of the optical module 23 is directly above a center of the rotating worktable. Sixthly, the light source emits a cross-shaped light, and the light passes through the center of the worktable 10, the center hole 111, the optical module 23, and the microscope device 15. Seventhly, the image sensor device 17 receives a changeable cross image because the optical module 23 is rotating, and transfers the image to the processing device 19. Finally, the processing device 19 analyzes the change of the image with the rotation of the motor 135, and obtains an eccentricity of the optical module 23.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for measuring eccentricity of optical module, comprising:
   a rotating worktable including a movable supporting plate configured for supporting the optical module, the supporting plate being adjusted to a position such that the center of the optical module is directly above a center of the rotating worktable;
   a light source configured for emitting a cross-shaped light passing through the optical module;
   an image sensor device receiving a changeable cross image from the optical module;
   a driving device for driving rotation of the rotating worktable; and
   a processing device connected to the image sensor device, wherein the processing device is configured for analyzing the changeable cross image from the optical module, and thus obtaining an eccentricity of the optical module.

2. The apparatus as claimed in claim 1, further comprising a microscope device, wherein the microscope device is configured for magnifying the image of the optical module, and the light source is aligned with the optical module.

3. The apparatus as claimed in claim 2, wherein the rotating worktable includes a gear edge.

4. The apparatus as claimed in claim 3, wherein the driving device includes a gear wheel and a motor, and the motor rotates the rotating worktable by cooperation between the gear edge and the gear wheel.

5. The apparatus as claimed in claim 4, wherein the supporting plate is square in shape, and the supporting plate includes two perpendicular slots.

6. The apparatus as claimed in claim 5, wherein the rotating worktable further includes two adjusting mechanisms connected to the slots of the supporting plate for adjusting the position of the supporting plate.

7. The apparatus as claimed in claim 6, wherein each of the adjusting mechanisms includes a bracket, a screw, and a positioning element.

8. The apparatus as claimed in claim 7, wherein the positioning elements connect to the slots of the supporting plate, and adjust the position of the supporting plate by adjusting the screws.

9. The apparatus as claimed in claim 3, wherein the supporting plate defines a center hole aligned with the light source and the optical module.

10. The apparatus as claimed in claim 9, wherein the rotating worktable has a transparent center aligned with the center hole of the supporting plate, the light source, and the optical module.

11. The apparatus as claimed in claim 3, wherein the microscope device is disposed above the supporting plate, and the light source is disposed below the rotating worktable.

12. The apparatus as claimed in claim 2, wherein the image sensor device is disposed on the microscope device.

* * * * *

UNITED STATES PATENT AND TRADEMARK OFFICE
CERTIFICATE OF CORRECTION

PATENT NO. : 7,627,449 B2  Page 1 of 1
APPLICATION NO. : 11/309688
DATED : December 1, 2009
INVENTOR(S) : Kuo-Lung Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Second Day of November, 2010

David J. Kappos
*Director of the United States Patent and Trademark Office*